US009632404B2

United States Patent
Grundhofer et al.

(10) Patent No.: US 9,632,404 B2
(45) Date of Patent: Apr. 25, 2017

(54) PROJECTION SYSTEM FOR ENHANCING AND MODIFYING THE APPEARANCE OF A PROJECTION SURFACE

(71) Applicant: Disney Enterprises, Inc., Burbank, CA (US)

(72) Inventors: Anselm Grundhofer, Greifensee (CH); Dumene Comploi, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 68 days.

(21) Appl. No.: 14/661,234

(22) Filed: Mar. 18, 2015

(65) Prior Publication Data
US 2016/0274447 A1   Sep. 22, 2016

(51) Int. Cl.
G03B 21/20 (2006.01)
G02F 1/01 (2006.01)
G03B 21/606 (2014.01)
G02F 1/313 (2006.01)

(52) U.S. Cl.
CPC ......... *G03B 21/206* (2013.01); *G02F 1/0126* (2013.01); *G02F 1/0147* (2013.01); *G02F 1/313* (2013.01); *G03B 21/2013* (2013.01); *G03B 21/606* (2013.01); *G03B 21/204* (2013.01)

(58) Field of Classification Search
CPC .... G03B 21/62; G03B 21/204; G03B 21/208; G03B 21/2013; C09D 7/1291; C09D 5/22; C09D 5/38; C09D 5/004
See application file for complete search history.

(56) References Cited

U.S. PATENT DOCUMENTS

| 5,159,362 | A | * | 10/1992 | Monroe | G03B 21/56 352/43 |
| 2003/0184718 | A1 | * | 10/2003 | Childers | H04N 9/317 353/122 |
| 2006/0072076 | A1 | * | 4/2006 | Smoot | G03B 15/10 353/34 |
| 2009/0269518 | A1 | * | 10/2009 | Dain | C09D 7/1291 428/29 |
| 2011/0164317 | A1 | * | 7/2011 | Vergohl | G03B 21/62 359/460 |
| 2012/0050687 | A1 | * | 3/2012 | Berry | A63J 5/00 353/10 |

* cited by examiner

*Primary Examiner* — Sultan Chowdhury
(74) *Attorney, Agent, or Firm* — Dorsey & Whitney LLP

(57) ABSTRACT

The present disclosure includes a projection system for enhancing color saturation and contrast for a projected image. The projection surface includes a coat containing active materials and the projection system includes a first light source emitting light onto the surface and defining a first image on the surface and a second light source emitting light onto the surface and activating the active materials within the transparent coat to emit visible light of one or more wavelengths. The first light source defines the first image and the visible light emitted from the active materials enhances one or more characteristics of the first image. In another embodiment, the second light source may be activated when the first light source fails to define a backup or static image that may be different or the same as the image produced by the first light source.

29 Claims, 8 Drawing Sheets

PROJECTION SYSTEM FOR ENHANCING AND MODIFYING THE APPEARANCE OF A PROJECTION SURFACE

FIELD

The present disclosure relates generally to a method and system for projecting images on a projection surface, and more specifically, embodiments relate to systems and methods for enhancing characteristics of the projected images.

BACKGROUND

Current projection systems used to project images onto various types of projection surfaces typically have limitations with respect to certain image characteristics such as saturation, brightness, uniformity, etc. For example, many conventional projectors do not provide sufficient color saturation when illuminating a surface, which reduces the artistic freedom and creativity of an artistic or creator while creating images to be projected.

Projectors are often used in theme parks or attractions. For example, projectors may be used to project an image onto an animatronic character, a scene onto a background surface, or the like. However, in instances of equipment failure, the unlit background or projection surface may create an undesirable appearance. As one example, when a projector is used to project an image, such as a face, onto an animatronic character, the face may appear black when the rear projector is turned off or fails. In a ride attraction this might lead to the undesirable appearance of a figure having a completely black head, which could be startling to children or otherwise impact the artistic effect of the attraction. It is desired to change this appearance to a friendlier look without losing the high contrast appearance of the projection surface.

It is with these shortcomings in mind that the present disclosure has been developed.

SUMMARY

The present disclosure includes a projection system for enhancing color saturation and contrast for a projected image. The projection surface includes a coat containing active materials (e.g., nano particles, fluorescent materials, photochromic, and/or thermochromic materials) and the projection system includes a first light source emitting light onto the surface and defining a first image on the surface and a second light source emitting light onto the surface and activating the active materials within the coat to emit visible light of one or more wavelengths. The first light source defines the first image and the visible light emitted from the active materials enhances one or more characteristics of the first image. In another embodiment, the second light source may be activated when the first light source fails to define a backup or static image that may be different or the same as the image produced by the first light source.

The present disclosure also provides a projection system or an illumination system, which includes a rear projector illuminating a surface from the rear surface (i.e., opposite side of the viewing surface) and an external projector placed in front of the surface or outside the surface. The illuminated surface may include a transparent coat positioned on its outer surface, the transparent coat may include active materials that are selectively activated. For example, the external projector activates the active materials in the transparent coat when the rear projector fails, producing a visible image or set of images.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

SPECIFICATION

Overview

Figure 1:
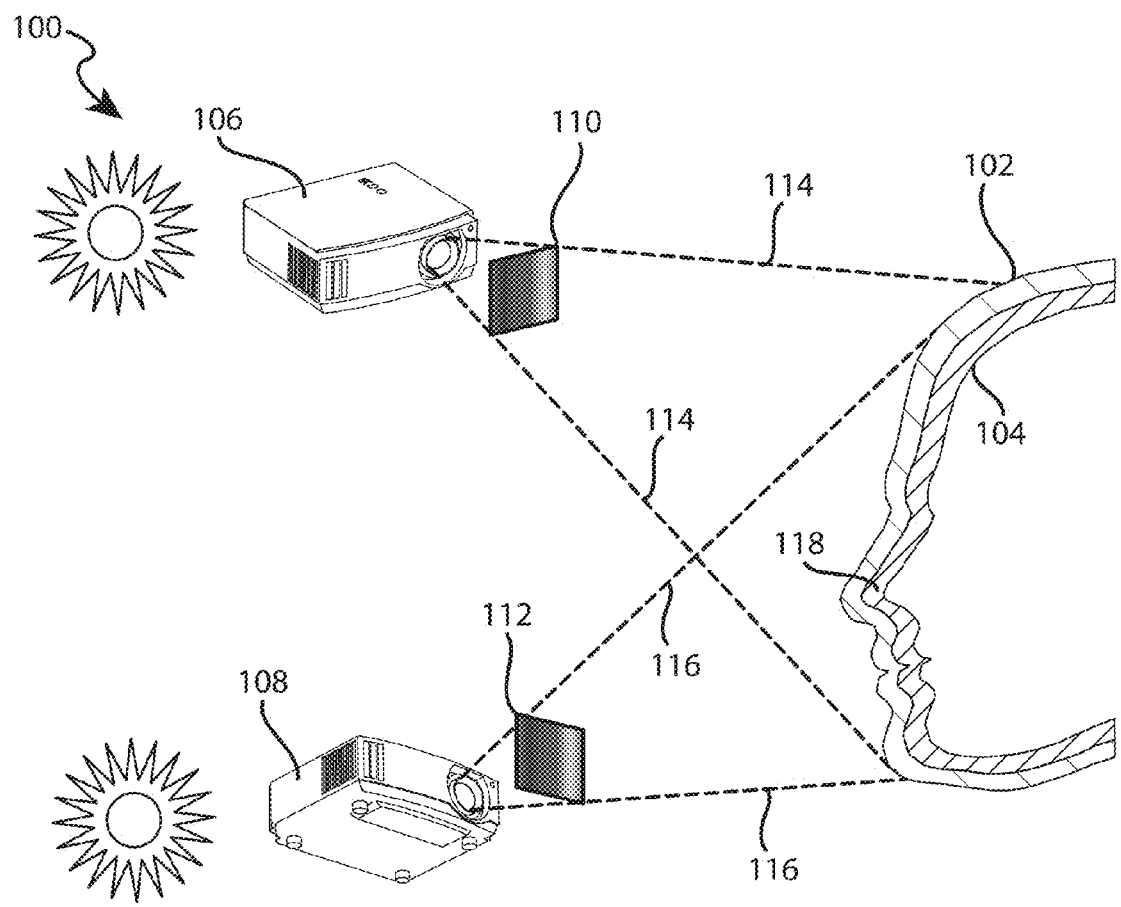
FIG. 1 illustrates a projection system including two projectors for illuminating a projection surface in accordance with embodiments of the present disclosure.

The present disclosure provides a system and method used to enhance certain characteristics of an image projected onto a surface. Additionally, the system and methods disclosed herein can also be used to provide a secondary image that is viewable on the projection surface and that does not interfere with the projected image. In particular, the present system includes selective activation of materials that react to certain input parameters, such as light or temperature. The materials may be transparent or may be a first color in a first state and emit a second color in a second state. By selectively activating the active materials, the second color is visible under select conditions, such that a secondary image is only present when the projection system for the first image is turned off.

In some embodiments, the system provides enhancement of certain image characteristics, such as, but not limited to, color saturation, brightness, and contrast, for static or dynamic images within a projection system. In these embodiments, the projection system may include one or more projectors, such as a first projector and a second projector, and may also include at least one additional layer of invisible or transparent active materials, such as nano-particles among other materials, that may be applied over a projection surface. When activated, the nano particles transform incoming light of a specific wavelength into outgoing light of another wavelength. For example, the nano particles can be activated by light of a particular wavelength to emit a visible light of another wavelength.

The nano particles or other active materials may define an enhancement image that overlays or aligns with a first image defined by the light from the first projector. In this manner, the enhancement image may enhance various characteristics of the first image, such as increasing the contrast, saturation, or the like.

The present disclosure also includes a system including a projector emitting ultraviolet (UV) light. The projector is arranged to illuminate a surface coated with a transparent coat to emit visible light, revealing an image or secondary pattern. This image is not visible or appears substantially transparent when not illuminated with UV light (i.e., under visible light conditions). This system solves the problem of an unwanted appearance of the surface color of rear-projected surfaces when the projector is turned off or otherwise malfunctions.

The present disclosure presents various methods to overcome the limitations of standard projection systems by applying layers of active materials onto the projection surface. For example, a layer of active materials, such as photochromic paint, thermochromic paint, fluorescent paint, or nanoparticle based paint, may be applied on the projected surface. These active materials may react with certain wavelengths and by selectively applying the activating wavelengths to the projection surface a desired outer appearance may be generated. The active materials provide enhancement for certain characteristics of a projection image and/or may be used to selectively display a desired image that may appear under certain conditions but may be transparent during other conditions.

The projection system can be used for amusement park attractions, entertainment features (e.g., shows, movies, or the like). In this example, a first projector may project an image onto a projection surface and a second projector may be used to selectively activate the active materials, where the second projector may emit light in wavelengths that are different from the first projector. In this example, the active materials are configured to interact with only select wavelengths, such as wavelengths in the UV or infrared range (IR), or discrete visible wavelengths (narrow red, green, or blue wavelengths). In particular, the active materials may react with specific wavelengths of visible light, such as narrow bands of red, green, and blue wavelengths from the second projector.

In this example, the second projector, which may be a liquid crystal display (LCD) projector or substantially any other type of spatial light modulator, activates the active material or emissive material when an image is projected onto the projection surface containing the active materials. To prevent the first projector (or main projector) from activating the active materials, an optical filter may be used to block the light wavelengths that activate the active materials. For example, in one embodiment, the first projector may have a first optical comb filter and the second projector may have a second optical comb, inversely related to the first optical comb. In this example, the light from the first projector creates the first image and the light from the second projector activates the active materials on the projection surface, to create an enhanced output image. Since the projection image from the first projector and the projection from the second projector generate different outputs on the projected surface, contrast enhancement and color saturation can be achieved with greater flexibility, as the contrast may be achieved using a color spectrum outside of a typical projector.

As briefly mentioned above, the projection system may also be used as a "fail safe" or to provide a secondary image in the event of projector failure or in the non-active state of the projector. For example, some theme parks include attractions that include displays having animated or projected images. As a specific example, a character in an attraction may include an animated face, where the facial features and expressions are created using a projector, such as a rear projector. In these examples, the character's face or other display area may appear blank when the projector is turned off, since painted or other static images on the projection surface may interfere with the projected images when the projector is activated. In these examples, the projector system of the present disclosure may be used to create a static or secondary image that does not interfere with the projection image when the projection system is on or active. In particular, the active materials may be substantially transparent under typical operating parameters of the theme park, but when activated, such as due to a projector failure, become visible.

As a specific embodiment, active materials may be selected so as to react with invisible light wavelengths, such as UV light or IR light wavelengths. In this example, the theme park or other attraction may have a light-controlled environment where only predetermined wavelengths are emitted. In the case of failure of a projector, such as the rear projector for a particular character failing, the projection system may quickly or even immediately switch on a light source to activate the active materials (e.g., a UV source or an IR source). The immediate switch may be realized by using a sensor element that measures the light emitted by the projector, light from the projection surface, or otherwise is configured to determine the failure status of the main projector system.

The additional layer of the active materials (e.g., the photochromic, thermochromic, fluorescent materials, or nanoparticle based paint) can be invisible under specific illumination conditions. This allows complex textures in arbitrary colors to be applied to substantially any surface and only be visible if the stimulating light sources are turned on. Depending on the projection system, the light sources may be a visible light source, a normal UV or IR light source, a custom made UV projector, or UV LEDs for the additional projector.

It should be noted that the terms "active materials" as used herein are meant to encompass substantially any type of nano particles, or nano particle based paints, photochromic materials or paints, fluorescent materials or paints, thermochromic materials or paints, or substantially any other type or reactive material, that can emit visible light wavelengths when exposed to light of a particular wavelength, or exposed to wavelengths outside of the visible spectrum (e.g., in the UV or IR spectrums). The active materials may be used for color enhancement and/or contrast enhancement and also as a secondary image in the event of a first image failure, such as a projector failure.

It should be noted that the terms "coat" as used herein is meant to include any type of enhancement coating, failure-protection coating, film, layer, interim coating over a surface, or the like that may be substantially transparent or have a first appearance under a first state and is visible or includes a second appearance in a second state. The coat may be applied to one or more substrates, such as, but not limited to, color painted or naturally colored surfaces. The coat includes one or more active materials or other elements that selectively interact with predetermined light wavelengths to produce a desired output. The term coat is meant to encompass one or more portions or sections of a layer on a surface. For example, a coat as described herein can be applied in a pattern where a first coat and a second coat are combined to create the entire coat, e.g., using a method similar to halftone printing or dithering. Similarly, the coat also includes a discontinuous layer, such as a layer including holes, patterns, or the like, e.g., the term coat may include a textile type pattern laid over a substrate.

DETAILED DESCRIPTION

Figure 7A:
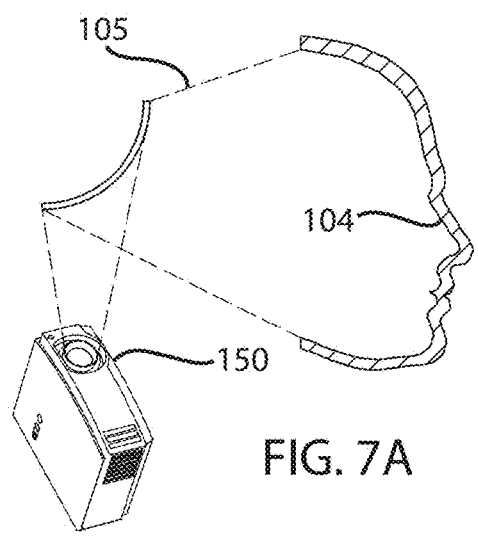
FIG. 7A illustrates a rear projection system.
Figure 8A:
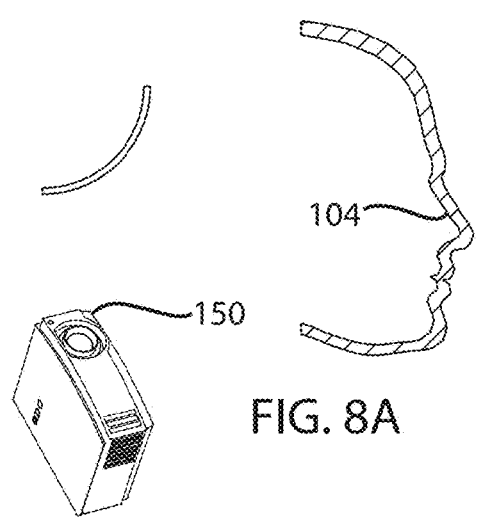
FIG. 8A illustrates a rear projection system with a projector malfunction or failure.
Figure 9A:
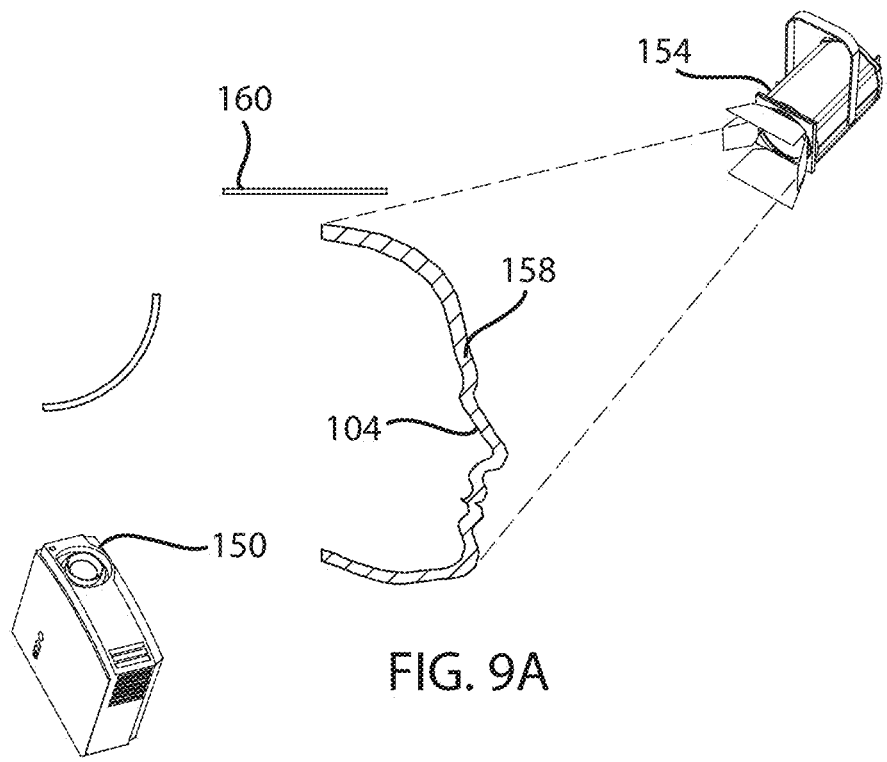
FIG. 9A illustrates a fail-safe projection system including an external light source in front of the surface of FIG. 7A and a transparent coating including active materials.

Turning to the figures, a projection system for activating the active materials will now be discussed in more detail. A main or first projector for illumination may be placed in the front of the projected surface, such as shown in FIG. 1, or placed in the back of the projected surface, such as shown in FIGS. 7A and 8A. The additional projector for activating the active materials may be placed in the front of the projection surface, as shown in FIG. 1 and FIG. 9A.

FIG. 1 illustrates a projection system including two projectors for illuminating a projection surface in accordance with embodiments of the present disclosure. As shown, projection system 100 may include a first projector 106 with a first optical filter, such as comb filter 110. The first projector 106 includes a visible light source that illuminates a projection surface that may be a painted surface 118 or other substrate. In one embodiment, the optical filter filters the light emitted so that a portion of visible light reaches the projection surface. The amount of light filtered is modifiable as desired and may be more or less than 50%, but generally is determined by the desired wavelengths to reach the projection surface and the filter may filter more or less of the light source to achieve the desired wavelength propagation.

The projection system 100 may also include a second projector 108 with a second inverse optical filter, such as inverse comb filter 112. The second projector 108 also includes a visible light source and due to the optical filter illuminates the same surface with a portion of the visible light. Because the two optical filters 110, 112 are inversely related to one another, in this configuration, the projection surface 118 receives the sum of all the light from all the projectors due to the combination of light from both projectors 106, 108. The amount of light projected by the projectors and that reaches the projection surface 118 is determined not only by the light amounts projected by each projector, but also is affected by optical losses due to physical constraints, hardware limitations, and the like.

In one embodiment, the light 116 from the second projector 108 activates the additional layer 102 of active materials on the painted surface 118. The first comb filter 110 blocks the specific wavelengths that the second inverse comb filter 112 transmits. In some embodiments, the comb filter may include several individual filters, where each individual filter filters only one color. However, it should be noted that the filtered wavelengths may be varied as desired and although a comb filter is disclosed, many other types of optical filters may be used.

The first projector 106 emits visible light to create a projection image on the projection surface. The light 114 from the first projector 106 may pass through the first comb filter 110 and in some embodiments about 50% of the light passes through the filter and is normally reflected from the projection surface 118 on the substrate 104. The first projector 106 also illuminates the projection surface 118 with additional filtered light excluding the specific wavelengths that react with the active material in the additional layer 102.

The second projector 108 provides light that interacts with the active material. The inverse comb filter 112 may pass 50% of the light from the second projector 108, and also may pass additional light 116 of specific wavelengths that do not interfere with the first projector 106 and activate or stimulate the active materials in the additional layer 102 on the painted surface 118, such as nanoparticles that can be activated by particular wavelengths, such that visible lights are emitted from the additional layer 102.

By using the additional projector 108 and applying the additional layer 102 activated by the additional projector, the reflected light from the projection surface (which may be a painted or textured surface or a naturally colored surface) may be strongly saturated. The saturated reflection includes both the normally reflected light from the painted surface with 50% from the first projector and 50% from the second projector. The additional reflection of selected wavelengths from the first projector and the additional emitted visible light of particular colors or selected wavelengths in desired regions to achieve color saturation and contrast enhancement. This combined approach may also increase dynamic range compared to use of only one of the projectors alone. For example, the transmitted light of specific wavelengths from the second comb filter does not overlap with the particular wavelengths from the first comb filter, which can increase the dynamic range to achieve contrast enhancement. Further, the color produced by the active materials may be outside of the color gamut of the first projector or may supplement the color gamut of the projector to create a more enhanced or varied image than is possible by the projector alone.

It should be noted that the percentage of light reaching the projection surface from the projectors 106, 108 may be varied based on a desired output. For example, although the above example is discussed with respect to each projector emitting about 50% of the light to reach 100% of the light onto the projection surface, other percentages may be used, e.g., 40%/60%, 30%/70%, or the like. Where the amount of filter light depends on the wavelengths desired to reach the projection surface, accounting for any optical losses, system and hardware constraints, of the like.

In addition, the paint or the additional layer of active materials may be applied inconsistently (e.g., not uniform), but also may include textures to further increase the dynamics of the reflected light. Additionally, some areas may include higher or lower concentration of active materials than other areas or regions, which may further vary the enhancement effect. The substrate 104 may be two-dimensional or three-dimensional, such as a character's face. The substrate 104 may be transparent, opaque, and/or naturally colored.

The active materials include, but are not limited to, nano particles, photochromic materials, thermochromic materials, or fluorescent materials. As the second projector 108 activates the additional layer 102 of active materials, the projection system 100 may provide freedom or flexibility to achieve subtle changes as desired, without requiring changes to the projected image of the first or main projector 106.

The substrate may be painted by applying paint and other materials that contain spatially varying colors and textures. The paint and materials may be configured to correspond with desired areas of the projected image, as the image will appear on the projection surface. For example, the paint and materials may be printed accurately onto the surface of the object, such as a character's face.

Figure 2A:
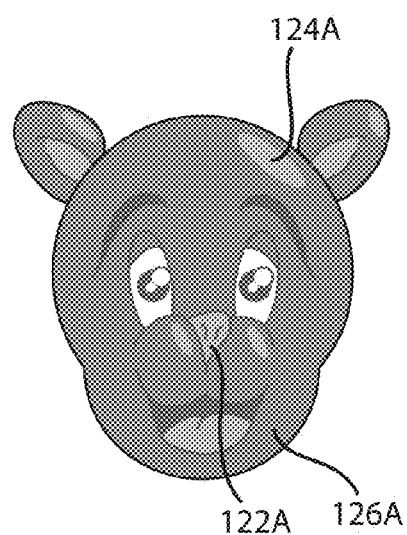
FIG. 2A illustrates an image from the projection system of FIG. 1 with only one projector activated.
Figure 2B:
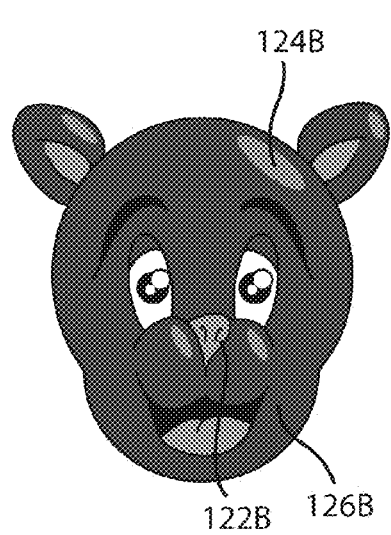
FIG. 2B illustrates the enhanced image of FIG. 2A with both projectors activated.

FIG. 2A illustrates a photograph of a color image 200A projected by the first projector of FIG. 1. In this example, only the first projector 106 illuminates the surface 118. FIG. 2B illustrates a photograph of an enhanced color image 200B obtained with both the projectors of FIG. 1 activated in accordance with embodiments of the present disclosure. Compared to FIG. 2A, image 200B has enhanced color contrast, hue, and saturation due to the light emitted from the active layer 102 being activated under the second projector. For example, a nose region 122B shown in FIG. 2B is more saturated in a red hue than a nose region 122A shown in FIG. 2A. Similarly, a forehead region 124B shown in FIG. 2B has a more saturated blue than a region 124A shown in FIG. 2A. Additionally, a blue region 126B in FIG. 2B is more saturated than the blue region 126A below the chin of the character 200A. To achieve the additional color saturation, the active layer 102 may include three components with each component configured to react to an individual wavelength, such as red, blue, or other color. These three specific wavelengths may pass through the inverse comb filter 112 in front of the second projector 108, but may be blocked by the first comb filter 110 in front of the first projector 106. The first comb filter transmits selected wavelengths of visible light that do not overlap with the red or blue.

It should be noted that although the colors red, green, and blue are discussed, many other colors may be used. To create additional colors, two or more types of particles are combined to create a mixture of emitted light that creates the desired color. For example, particles that emit red and particles that emit green when exposed to the same wavelengths can be used to create a brown color for the enhanced image. The selection of the particles depends on the desired color to be emitted, light wavelengths to be used, as well as the underlying colors of the substrate.

The additional layer(s) 102 may include nano particles emitting red, green, blue or other selected light wavelengths. When the projection surface including the active layers is illuminated by spatially varying by select wavelengths, the color saturation of the output image is significantly enhanced. In particular, by projecting the specific wavelengths from the second projector onto the painted surface, the active materials may emit light wavelengths (such as red or green) that enhance the projected image and/or substrate visible colors. The nanoparticles (or other active components) in the additional layer 102 coated over the painted surface may be stimulated or activated by the additional projector to emit the desired colors, such as red, green, and blue, which generate a color tone or texture with higher saturation, compared to the projection onto a uniformly colored surface by only using the first projector.

When colored or white paint is applied on the projection surface, a layer transparent under visible light may be added to the painted surface. As described above, the coat or layer applied to the projection surface may be applied continuously or discontinuously, depending on the desired appearance (see, e.g., FIG. 4B). The transparent layer or coat may react with a light of a specific wavelength. More transparent layers may be added with each transparent layer reacting with a light of a different wavelength from another transparent layer. The painted surface may appear colored when illuminated by the projection system 100. The appearance may be due to the effect of the active materials alone or a combination of a colored paint and the visible light emitted from the active materials. In one example, the projection surface may be colored red and the active materials may emit a blue light, such that the projection surface may appear purple to a viewer.

Figure 3:
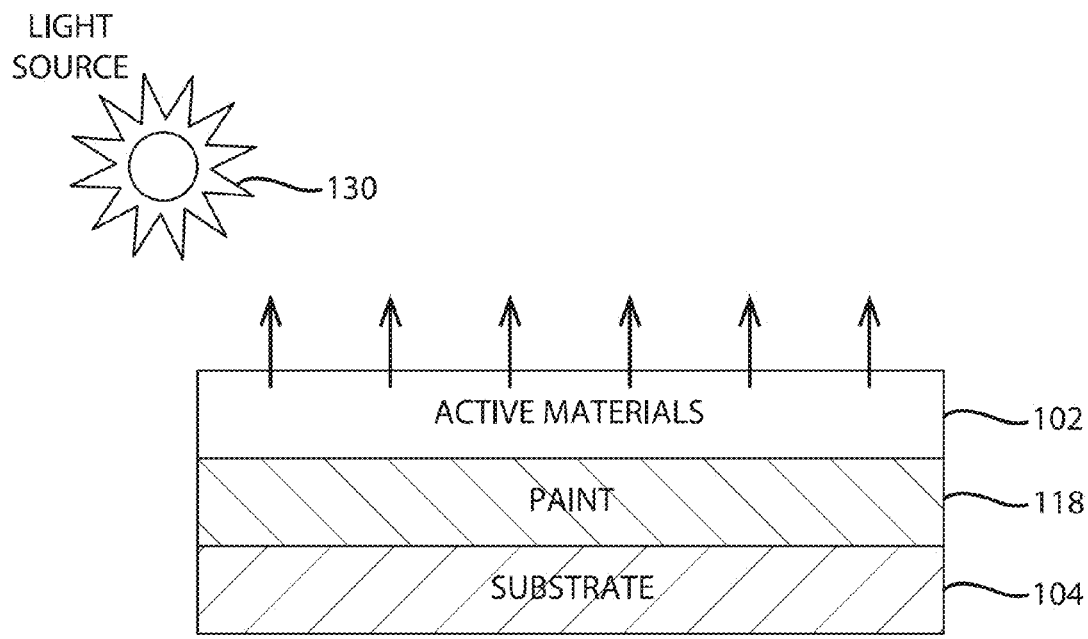
FIG. 3 is a simplified diagram illustrating an external light source activating active materials coated over a substrate.

FIG. 3 shows a light source 130 that illuminates a substrate 104 painted with paint layer 118 and coated with at least one additional layer or more layers 102 of active materials over the paint layer 118. The active materials can emit visible light when activated by the light source 130.

In some embodiments, the substrate 104 may be naturally colored and the active materials may be directly applied to the substrate. That is, the paint layer 118 may be omitted or may be clear.

Figure 4A:
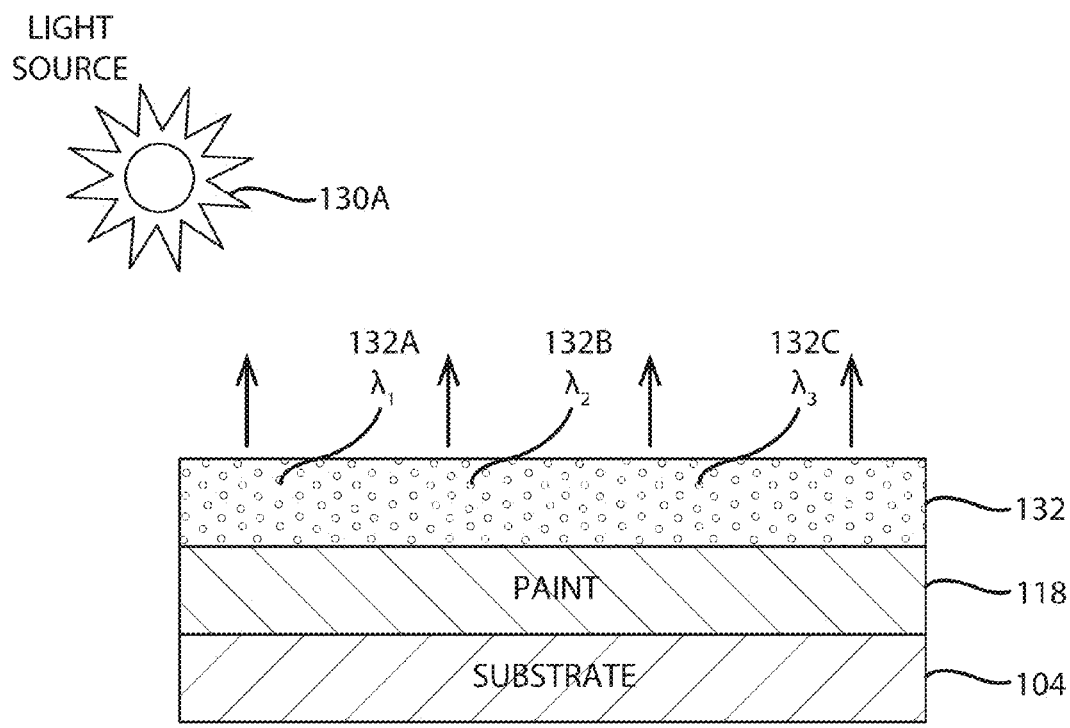
FIG. 4A is a simplified diagram illustrating a visible light source activating active materials containing mixed nano particles coated over a substrate.

In some embodiments, the active materials may be nano particles, which may be first mixed and then applied to a painted substrate. FIG. 4A shows a visible light source 130A that illuminates a substrate 104 painted with paint layer 118 and coated with at least one additional layer 132 of three types of nano particles over the paint layer 118. Each type of three nano particles 132A, 132B, and 132C emits a specific visible light with a respective wavelength $\lambda_1$, $\lambda_2$, or $\lambda_3$. The nano particles may be transparent to human eyes in visible spectrum. When illuminated by a visible light of a specific wavelength, the nano particles emit visible light of another specific wavelength. The emitted light may vary with the nano particles used in the additional layer. The nano particles may emit visible light with a narrow bandwidth, for example, 25 nm plus or minus. For example, the nano particles emit visible lights, for example, ranging from 50 nm to 80 nm. The characteristics of the nano particles may be selected based on a desired visible output. As an example, only certain colors may be desired in which case only nano particles that emit the desired color wavelengths may be used.

The nano particles may provide enhancement or otherwise vary one or more characteristics of a surface or output image, such as, but not limited to, hue, contrast, saturation, and the like, as the nano particles emit visible light. The emitted light from nano particles can be substantially instantaneously turned on and off, such that they can be used in effects using fast motion or animation. Additionally, the quick activation allows the active materials to be activated substantially simultaneously with the projected image.

Nano particles, such as particles produced by Intelligent Material Solutions, Inc., transform energy from various input wavelengths to different output wavelengths. The energy transformation may be accomplished by using a combination of rare-earth lanthanides as dopants on ceramic microparticles. For example, the energy transfer may be achieved by using a combination of a trivalent rare-earth sensitizer (e.g. Yb, Nd, Er, or Sm) as the element that initially absorbs the electromagnetic radiation and a second lanthanide activator (e.g. Er, Ho, Pr, Tm) ion in an optical passive crystal lattice that serves as the emitting elements. By varying the concentrations and ratios of rare earths, different emission spectra can be elicited from the same combination of elements. The rare earth-doped nanocrystals are of small size, high quantum efficiency, and high photoluminescent intensity functionalized.

Figure 4B:
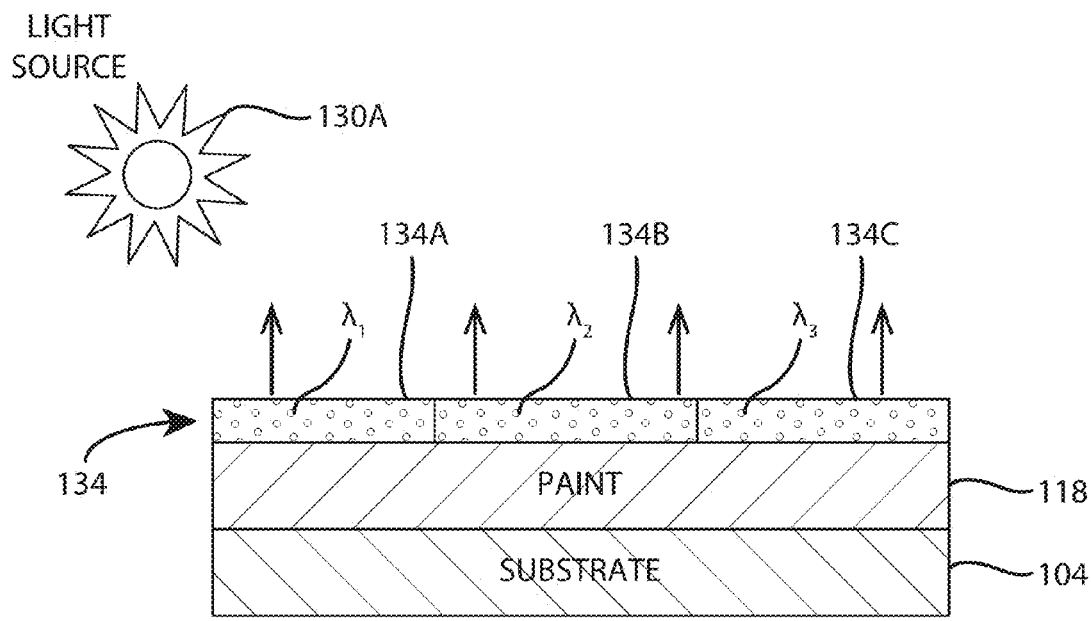
FIG. 4B is a simplified diagram illustrating a visible light source activating active materials containing various nano particles coated over different portions of a substrate.

In some embodiments, various nano particles may be applied to different portions of a painted surface. FIG. 4B is a simplified diagram illustrating using a visible light source that activates the materials containing different nano particles coated over different portions of a substrate in accordance with embodiments of the present disclosure. As shown, nano particles 132A-C are applied in regions 134A-C respectively to form one additional layer. In this manner, the coat is discontinuous as it includes multiple regions, but the combination of regions forms the entire coat. It should be noted that the regions can be adjacent or overlapping to one another. Further, the regions can be arranged in a pattern (random or planned). The nano particles in each portion may emit different visible light wavelengths from one another or may emit the same wavelengths.

Figure 4C:
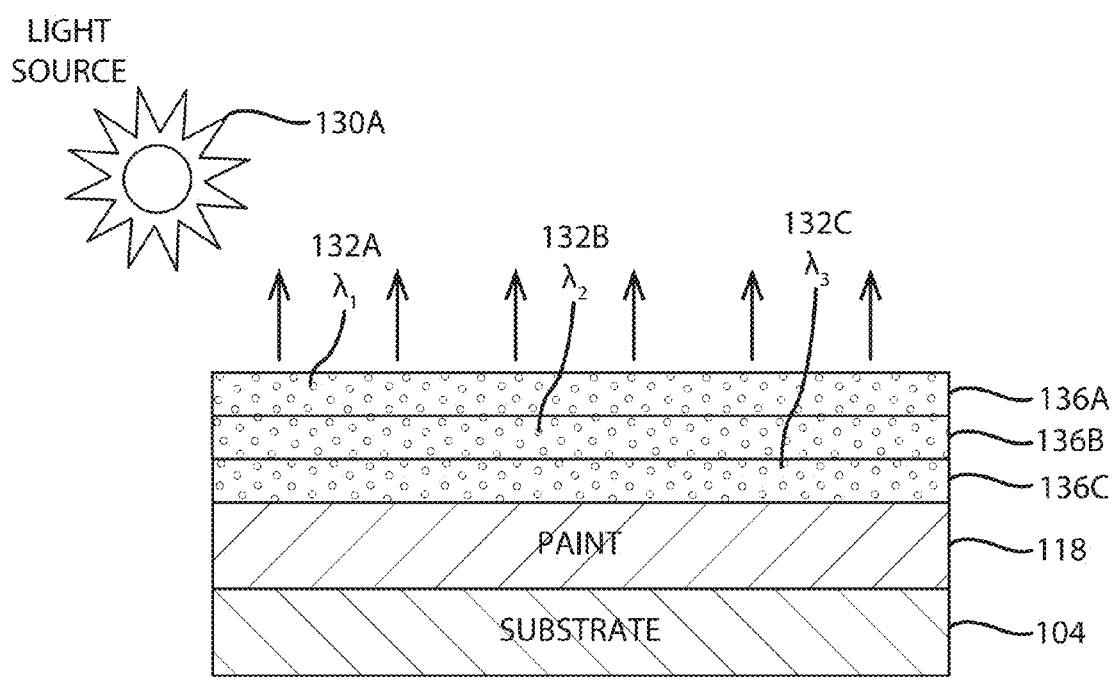
FIG. 4C is a simplified diagram illustrating a visible light source activating active materials containing three layers of three different nano particles coated over a substrate.

In some embodiments, various nano particles may be applied separately, rather than mixed together before being applied to the painted substrate. FIG. 4C is a simplified diagram illustrating using a visible light source 130A that activates the materials containing three layers 136A, 136B, and 136C, each layer with a different nano particle, 132A, 132B, or 132C with corresponding characteristic wavelengths $\lambda_1$, $\lambda_2$, or $\lambda_3$. The active layers 136 are coated over a color painted substrate 104 with paint layer 118.

It will be appreciated by those skilled in the art that there may be more or less nano articles applied to a painted substrate or surface and with combination of the embodiments illustrated in FIGS. 4A-4C.

Figure 5:
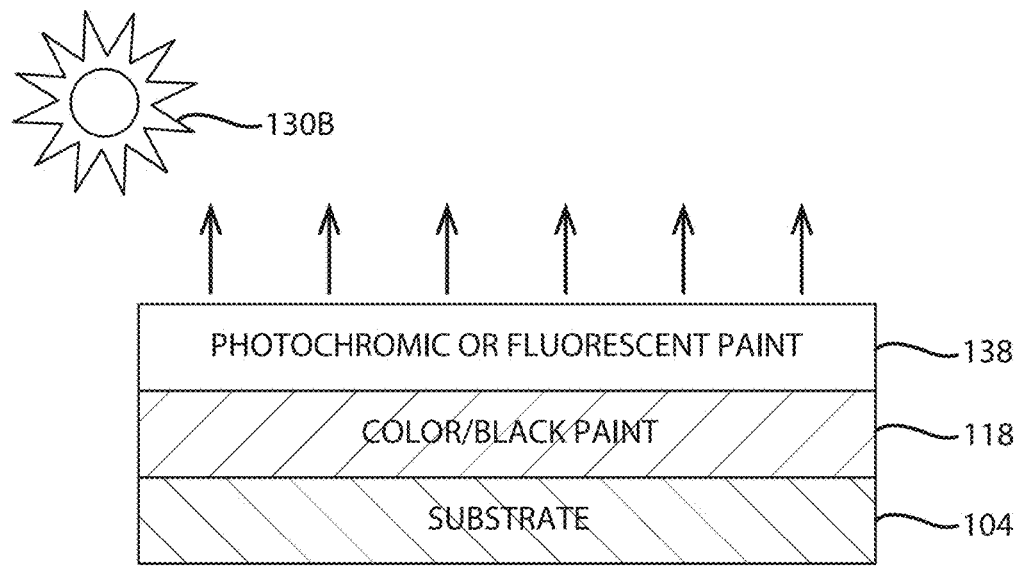
FIG. 5 is a simplified diagram illustrating an ultra violet light source activating photochromic or fluorescent materials coated over a substrate.

The active materials may also be photochromic or fluorescent materials that interacts with UV light. For example, a surface painted with photochromic material can change from colorless, white, or transparent to a particular color, for example, blue, violet, pink, green, or yellow, or any mixed color, by exposure to UV light. When removed from the UV source, the colored surface reverses back to its original color. FIG. 5 shows a UV source 130B that illuminates a substrate 104 painted with paint layer 118 and coated with at least one additional layer or more layers 138 of photochromic materials or fluorescent materials over the paint layer 118, which may be colored or white.

In some embodiments photochromic materials may be used as the active material. Photochromic materials vary their reflectance when exposed to UV light. Most photochromic materials may require some time to change. For example, if a photochromic material is applied on a surface, the photochromic material may require a second or two seconds to react such that this technique is not fast enough for animation or other quickly varying images. However, some photochromic materials may react in milliseconds, such as 20 frames per second, which may be sufficient for certain animations or other outputs. As compared to nano particles, photochromic materials may not generate as high of a contrast because photochromic materials do not emit light, but rather alter their light absorption, i.e. their reflectance properties. In this manner, the photochromic materials can switch from white to dark (as one example) such that less light is reflected, but this change may not generate as high of a contrast change as compared to the nano particles that emit light wavelengths.

The photochromic materials may be in various forms, such as water soluble slurry, powders, polymer pellets, or dyes. For example, the photochromic water soluble capsule slurry can make water paint by mixing with the binder. The photochromic powders can make oil paint by mixing with the oil binder, which can be printed on film, glass, or metal. The polymer pellets including photochromic materials, such as polypropylene pellets, can be used to make films. The photochromic dyes can be dissolved in organic solvent. The photochromic paints are commercially available from Japanese companies such as Kiroku sozai sogo kenkyusho co., LTD, or Yamada Chemical Co., LTD.

In some embodiments, fluorescent materials may be used as the active materials. The fluorescent materials emit visible lights when exposed to UV lights or other electromagnetic radiation. The fluorescent materials may generate a higher contrast and color enhancement, as the fluorescent materials emit visible light, like the nano particles. The fluorescent materials can be instantaneously turned on and off, similar to the nano particles.

The active materials may also be thermochromic materials, which are able to change colors due to changes in temperature. For example, by increasing or decreasing an ambient temperature or a temperature of the projection surface thermochromic materials change from a first color (or colorless) to a second color. In embodiments including thermochromic materials, the temperature change may be activated by IR radiation that warms the projection surface. Alternatively, the second projection may be omitted and a warming or cooling structure (e.g., heating coils or a heat exchanger system) may be positioned beneath the substrate. The thermochromic paints are commercially available from the Japanese companies such as Kiroku sozai sogo kenkyusho co., LTD, or Yamada Chemical Co., LTD.

Figure 6:
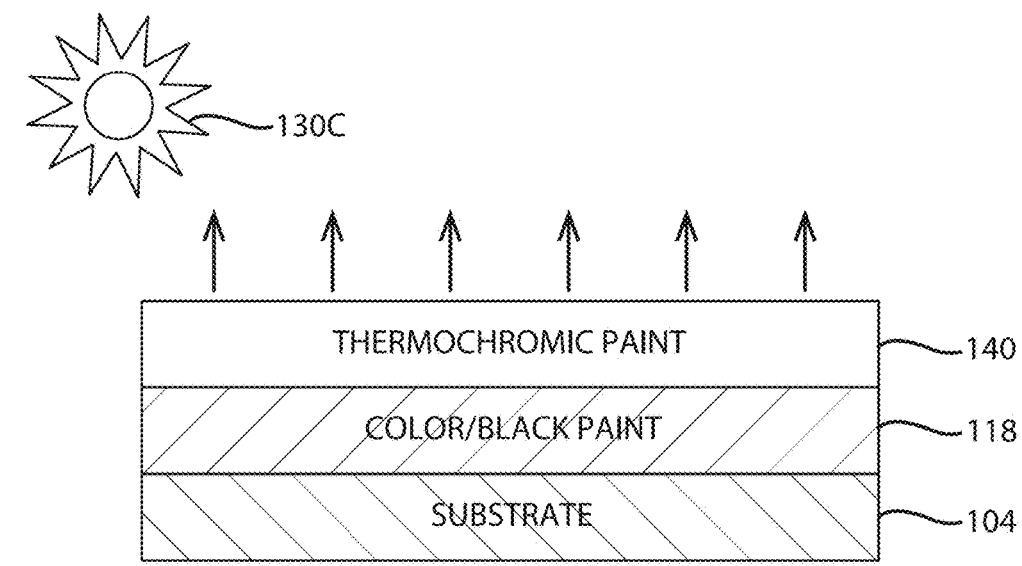
FIG. 6 is a simplified diagram illustrating an infrared (IR) light source activating thermochromic materials coated over a substrate.

FIG. 6 is a simplified diagram illustrating using an IR light source to activate thermochromic materials coated over a color painted substrate in accordance with embodiments of the present disclosure. As shown, an IR source 130C illuminates a substrate 104 painted with paint layer 118 and coated with at least one additional layer or more layers 140 of thermochromic materials over the paint layer 118. The paint layer 118 may be colored, or black, or in some embodiments may be omitted.

Figure 7B:
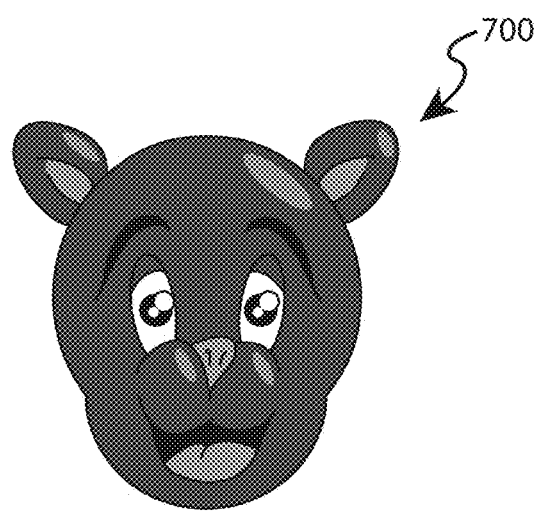
FIG. 7B is an image of a projection surface illuminated by the rear projection system of FIG. 7A.

FIG. 7A shows the usual illumination conditions in which a rear projector 150 illuminates a surface 104 from the back-side. FIG. 7B is a color image 700 of the image projected by the rear projector of FIG. 7A in accordance with embodiments of the present disclosure. The color image of a character face is generated statically and dynamically, including a portion of color painted and a dynamic portion formed from the rear projector 150 by the image 115 projected onto the projection surface.

Figure 8B:
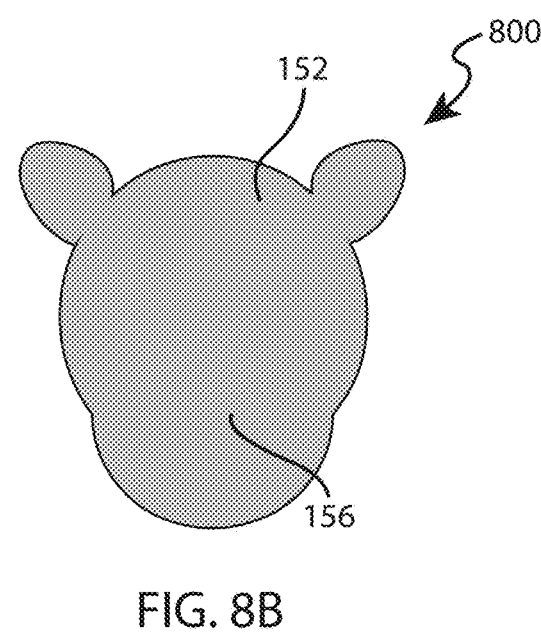
FIG. 8B is an image of the projection surface with a black portion due to the failed rear projection system of FIG. 8A.

FIG. 8A shows that the rear projector 150 fails to project light onto the surface 104. FIG. 8B is an image 800 of the surface appearance due to the failed rear projector of FIG. 8A. As shown in FIG. 8B, a grey portion 152 surrounding the nose is the region where the image is dynamically generated by the projector 150. The grey portion represents the color of the screen or other surface onto which the image is typically projected. When the projector 150 fails, the projected portion of the surface 104 may appear black, grey, or another substantially uniform color from the front side or viewing surface 104. Because the projection surface may form the face or other portions of a character or animatronic, the blank surface may interfere with a desired outer appearance and may reduce the desired effect for the amusement attraction.

FIG. 9A shows an image of the projection surface with a layer 158 of active materials applied to the surface 104. In this example, an external light source 154 is placed in front of the surface 104 to illuminate the surface, activating the layer 158, when the projector 150 fails or is turned off. The light source 154 can be used to stimulate or activate the active materials in the additional layer 158 to emit visible lights to show a desired color or texture of the character face.

Figure 9B:
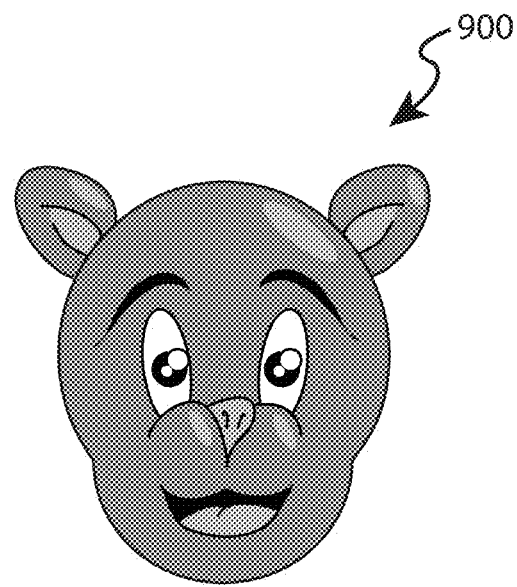
FIG. 9B is an image of the projection surface with the active materials within the transparent activated by the external light source of FIG. 9A.

For example, as shown in FIG. 9B, an image 900 with a texture obtained by the external light source that activates the additional transparent layer of FIG. 9A. The color of image 900 may shift from the color of image 700 depending upon the active materials. For example, the face 900 may have a different color tone from the face 700.

For example, the active materials in the additional layer 158 may be nano particles, photochromic paints, fluorescent paints, or thermochromic paints. The light source 154 may be a UV source, such as a UV projector or UV LEDs as two examples, to activate the photochromic paints or fluorescent paints to emit visible light. The photochromic or fluorescent paints may be transparent or may have a faded appearance under visible light. The photochromic or fluorescent paints may be selected so as to not interfere with the rear projector 150 when it is operational (i.e., do not affect the appearance of images projected onto the projection surface). When the UV source 154 is activated, the photochromic paint or fluorescent paint emits visible light wavelengths to create a desired appearance or enhance a desired output. For example, even with the rear projector off or deactivated, the active materials when activated create the appearance of the face, as shown in FIG. 9B. The face 900 includes colors that cover the blank portion, as shown in face 800, as the face is defined by the active materials, which may be static as compared to the animated projected images, but provides an desirable appearance, even during a malfunction of the rear projector.

As discussed above, thermochromic materials react to temperature change and as such when used, a controlled environment may be required. For example, the temperature within a particular area including the animatronic or character may remain at a predetermined value when the rear projector (or other projection system) is activated. To activate the thermochromic materials, the temperature of either the area or the substrate where the materials are applied may be heated or cooled. For example, an IR projector may be activated and emit IR radiation against the substrate to warm the substrate and activate the thermochromic materials.

The choice of light source may depend upon the type of active materials that are used. For example, certain active materials may be activated by UV wavelengths, others may be activated by IR wavelengths, and still others may be activated by both wavelengths.

In some embodiments, the substrate or character including the active materials may be used in an environment with light pollution from other sources. For example, some amusement park attractions may represent a cave or other dark environment and the amusement park attraction may have low light and use UV lights to activate fluorescent or other materials within the ride. These other light sources may inadvertently trigger the photochromic materials or fluorescent materials. Therefore in some embodiments a shield or filer may be selectively positioned around the desired area to screen light wavelengths from external sources from reaching the projection surface. Referring to FIG. 9A again, a shield 160 may be placed near the surface 104, and may be configured to shield unwanted UV lights from surroundings. The shield 160 may be a transparent film in visible light, but blocks UV light, or may be otherwise configured based on the types of lights surrounding the projection surface.

Figure 10:
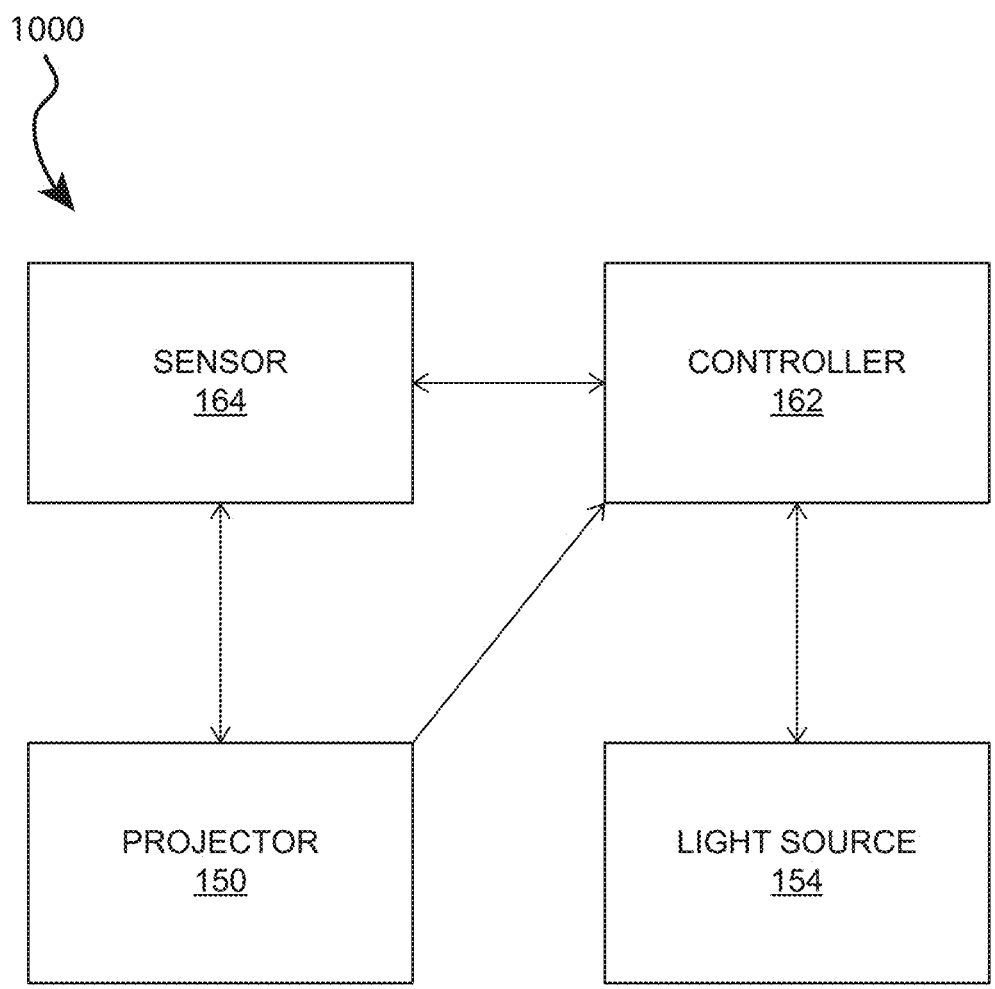
FIG. 10 is a system diagram of the projection system.

FIG. 10 is a system diagram that may be used to obtain the projection of FIG. 9B in accordance with embodiments of the present disclosure. A controlled projection system 1000 may include a projector 150, a controller 162, a sensor 164 in communication with the controller 162, and a light source 154 electrically coupled to the controller 162. The controller 162 may turn on the projector 150. The sensor 164 may detect if the projector 150 fails to illuminate a surface and communicate to the controller 162. For example, the sensor may be an optical sensor, a heat sensor, a motion sensor, or another type of sensor that may detect various characteristics of the projector when the projector is operating. The controller 162 may include a processor that can receive the signal from the sensor 164 that indicates the failure of the projector 150. Then, the controller 162 may turn on the light source 154 to illuminate the projected surface. The light source 154 may be a UV source, or an IR source, depending the active materials coated onto the surface, and may be positioned on a front side of the projection surface or a rear side of the projection surface.

Figure 11:
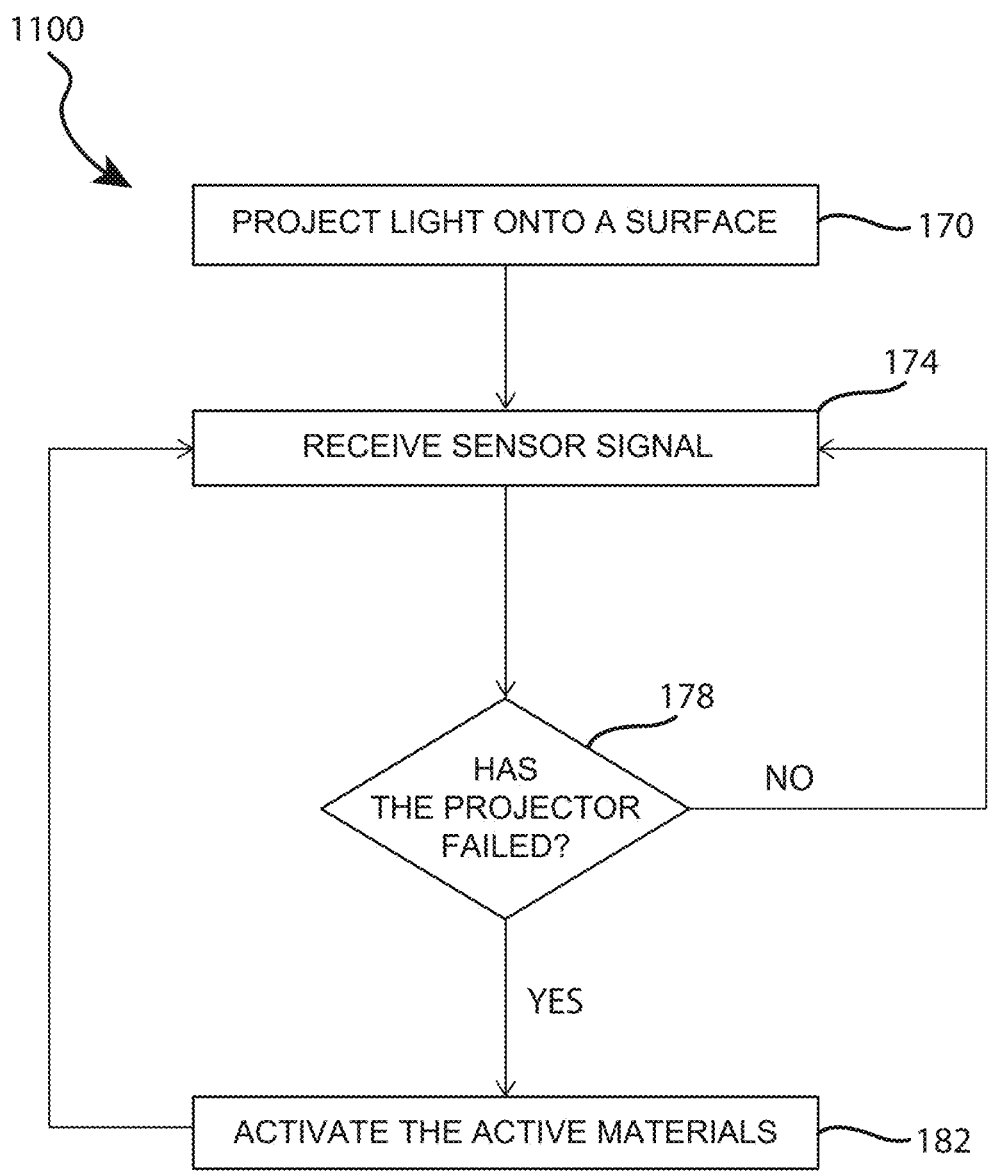
FIG. 11 is a flow chart illustrating a method of using the projection system of FIG. 10.

FIG. 11 is a flow chart illustrating steps of using the controlled projection system 1000 to obtain the image 900 in accordance with embodiments of the present disclosure. Method 1100 may include turning on a projector 150 to project light onto a surface (e.g. surface 104) at operation 170. Method 1100 may also include receiving a signal from a sensor 164 that detects if the projector (e.g., projector 154) fails by using the sensor (e.g. sensor 164) at operation 174. Method 1100 may further include determining if the projector 150 fails by using the controller (e.g. controller 162) at operation 178. If the projector 150 does not fail, the controller returns to the step of receiving a signal from the sensor 164 at operation 174, and the controller 162 determines if the projector fails or not at operation 178, which may repeat until the projector fails. If the controller determines that the projector fails, method 1100 may include turning on the light source 164, either a UV source or an IR source, at operation 182.

The color saturation achieved by embodiments disclosed herein may be quantitatively defined by a color gamut. The color gamut may be increased by 10%, 15%, 20%, 25%, or 30%, or higher depending upon the active materials.

Conclusion

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A projection system for enhancing color saturation and contrast of a surface having a coat containing active materials, comprising:
   a first light source emitting light onto the surface and defining a first image on the surface;
   a second light source emitting light onto the surface and activating the active materials within the coat to emit visible light of one or more wavelengths;
   a first optical filter positioned between the first light source and the surface; and
   a second optical filter positioned between the second light source and the surface, wherein the first optical filter filters wavelengths passed through by the second light source.

2. The projection system of claim 1, wherein the visible light emitted from the active materials enhances one or more characteristics of the first image.

3. The system of claim 1, wherein first optical filter and the second optical filter are optical comb filters.

4. The system of claim 1, wherein the first optical filter transmits about half the light wavelengths emitted from the first light source and the second optical filter transmits about half of the light wavelengths emitted from the second light source.

5. The system of claim 1, further comprising a first projector comprising the first light source and a second projector comprising the second light source.

6. The system of claim 1, wherein the transparent coat comprises a first plurality of first nano particles emitting a first wavelength of visible light when activated by the light emitted from the second light source.

7. The system of claim 6, wherein the transparent coat comprises the first plurality of nano particles over a first portion of the surface and the second plurality of nano particles over a second portion of the surface.

8. The system of claim 7, wherein the first nano particles and the second nano particles emit different wavelengths when activated.

9. The system of claim 5, wherein the transparent coat comprises:
a first layer containing the first plurality of nano particles over the surface; and
a second layer containing the second plurality of nano particles over the first layer.

10. The system of claim 1, wherein the second light source comprises an ultraviolet light source.

11. The system of claim 10, wherein the active materials comprise at least one of fluorescent materials or photochromic materials.

12. The system of claim 1, wherein the second light source comprises an infrared light source while the active materials comprise thermochromic materials.

13. A method for enhancing color saturation of a surface, comprising:
filtering light from a first light source to transmit light wavelengths that do not include at least one wavelength;
illuminating the surface by the first light source;
filtering light from a second light source to transmit light of the at least one wavelength;
illuminating the surface by the second light source, wherein a transparent coat containing active materials is positioned on the surface; and
activating the active materials in the transparent coat by the at least one wavelength.

14. The method of claim 13, wherein filtering light from the first light source comprises placing a first optical filter in front of a first projector including the first light source.

15. The method of claim 14, wherein filtering light from the second light source comprises placing a second optical filter in front of a second projector including the second light source.

16. The method of claim 15, wherein the second optical filter is inverse to the first optical filter such that the second optical filter transmits specific wavelengths while the first optical filter blocks the specific wavelengths.

17. The method of claim 13, wherein the active materials comprise at least one or more nano particles.

18. The method of claim 13, wherein the transparent coat comprises a first plurality of first nano particles emitting a first wavelength of visible light and a second plurality of second nano particles emitting a second wavelength of visible light when activated.

19. The method of claim 13, wherein the second light source comprises an ultra violet light source.

20. The method of claim 13, wherein the second light source comprises an IR source, and the active materials comprise thermochromic materials.

21. An illumination system comprising:
a first projector configured to illuminate a projection surface with a first image, the projection surface comprising a transparent coat including active materials; and
a second projector configured to illuminate the projection surface and emit wavelengths to activate the active materials, wherein the active materials are deactivated when the first projector is activated and activated when the first projector is deactivated.

22. The illumination system of claim 21, further comprising
a sensor configured to detect operation of the first projector; and
a controller in electrical communication with the sensor and the second projector, wherein the controller activates the second projector when the first projector is deactivated.

23. The system of claim 21, wherein the external projector comprises an ultra violet source and the active materials comprise photochromic paint or fluorescent paint.

24. The system of claim 21, wherein the external projector comprises an infrared source and the active materials comprise thermochromic paint.

25. A method for controlling illumination of a projection system by a controller, the method comprising:
turning on a first projector of the projection system to illuminate a surface and define a first image thereon, the surface including a transparent layer of active materials;
receiving a signal from a sensor when the first projector is turned off, the sensor being in communication with a controller; and
when the first projector turns off, activating a second projector to illuminate the surface and causing the active materials to emit visible light and reveal a second image on the surface.

26. The method of claim 25, wherein the active materials comprise one of photochromic materials, fluorescent materials, or thermochromic materials.

27. The method of claim 25, wherein the first projector is a rear projector and the second projector is a front projector.

28. The method of claim 25, wherein the second projector comprises an ultra violet light source and the active materials comprise photochromic materials or fluorescent materials.

29. The method of claim 25, wherein the second projector comprises an infrared source and the active materials comprise thermochromic materials.

* * * * *